United States Patent
Kachline (10) Patent No.: US 10,543,555 B2
(45) Date of Patent: Jan. 28, 2020

(54) TORCH CLAMP

(71) Applicant: LINCOLN GLOBAL, INC., Santa Fe Springs, CA (US)

(72) Inventor: Jeffrey L. Kachline, Highland Heights, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 379 days.

(21) Appl. No.: 15/586,448

(22) Filed: May 4, 2017

(65) Prior Publication Data

US 2018/0050416 A1 Feb. 22, 2018

Related U.S. Application Data

(60) Provisional application No. 62/375,704, filed on Aug. 16, 2016.

(51) Int. Cl.
| | |
|---|---|
| *B23K 9/10* | (2006.01) |
| *B23K 9/28* | (2006.01) |
| *B23K 9/133* | (2006.01) |
| *B65H 51/04* | (2006.01) |

(52) U.S. Cl.
CPC .............. *B23K 9/133* (2013.01); *B65H 51/04* (2013.01)

(58) Field of Classification Search
CPC ........ B23K 1/00; B23K 26/211; B23K 9/124; B23K 9/133; B23K 9/1336; B23K 9/173; B23K 9/32; B65H 51/04
USPC ...................... 219/130.1, 136, 137.2–137.63, 219/137.9–143, 161
See application file for complete search history.

(56) References Cited

U.S. PATENT DOCUMENTS

| | | | | |
|---|---|---|---|---|
| 3,675,837 A | * | 7/1972 | Gerould | B23K 9/1336 226/187 |
| 3,901,425 A | * | 8/1975 | Taylor | B23K 9/1336 226/108 |
| 4,270,824 A | | 6/1981 | Erickson | |
| 4,426,046 A | * | 1/1984 | Heuckroth | B23K 9/1336 226/168 |
| 5,521,355 A | * | 5/1996 | Lorentzen | B23K 9/1336 219/137.61 |
| 6,131,361 A | * | 10/2000 | Murphy | E04F 21/185 248/221.12 |
| 6,388,234 B1 | | 5/2002 | Collins | |
| 6,462,961 B1 | * | 10/2002 | Johnson | A47B 81/06 211/26 |

(Continued)

FOREIGN PATENT DOCUMENTS

| | | |
|---|---|---|
| EP | 1268111 | 1/2003 |
| EP | 1574302 | 9/2005 |
| JP | 4653427 | 1/2006 |

*Primary Examiner* — Sang Y Paik (57) ABSTRACT

The invention described herein generally pertains to a system and method related to a semi-automatic or a manual welding operation and utilizing a member or a clamp to removeably secure a torch or a torch cable to a wire feeder. The member can include a first portion that is separated from a second portion, wherein a curved portion is in between the first portion and the second portion. The member can include an opening on the first portion that blocks a path of connect or disconnect with a portion of the torch or the torch cable. Further, the member can include an aperture on the second portion that is used to couple to a portion of the wire feeder with a fastener.

12 Claims, 11 Drawing Sheets

(56) References Cited

U.S. PATENT DOCUMENTS

| | | |
|---|---|---|
| D513,168 S | 12/2005 | Chu |
| D576,856 S * | 9/2008 | Franks, Jr. ........... B23K 9/1336 |
| | | D8/72 |
| 7,420,923 B2 | 9/2008 | Helgesen |
| D587,094 S | 2/2009 | Fonk |
| 7,495,192 B2 | 2/2009 | Takahashi |
| 7,624,908 B2 | 12/2009 | Enyedy et al. |
| D609,080 S | 2/2010 | Schorn |
| 7,800,017 B2 | 9/2010 | Zamuner |
| 8,389,899 B2 | 3/2013 | Natta et al. |
| D712,226 S | 9/2014 | Francaviglia |
| D712,816 S | 9/2014 | Maholick |
| 9,296,058 B2 | 3/2016 | Willenkamp |
| 9,677,691 B2 * | 6/2017 | Multer ...................... F16L 3/00 |

* cited by examiner

TORCH CLAMP

CROSS-REFERENCE TO RELATED APPLICATIONS

This application is a continuation of and claims the benefit of U.S. Provisional Application Ser. No. 62/375,704 filed on Aug. 16, 2016. The entirety of such application is incorporated herein by reference.

TECHNICAL FIELD

In general, the present invention relates to a member used with a welding device that performs a welding operation, wherein the member maintains connectivity of the torch with the wire feeder.

BACKGROUND OF THE INVENTION

Welding devices or systems often include a screw system that is used to secure a torch to a wire feeder. The torch assembly for connectivity to a wire feeder includes the torch with a male insert that mates with a female part, wherein the female part contains a separate piece that gets wedged into contact with the male member as the screw system is tightened. If the screw system that secures or tightens the separate piece becomes loose over time or is not secured tight enough, the torch can separate from the feeder. When the screw system is loose, the torch can push out of the feeder and wire can escape from the intended conduit path causing a short. This short can often cause damage to the surrounding area. Accordingly, an improved welding device, methodology, and/or system addressing these concerns is needed.

SUMMARY OF THE INVENTION

In accordance with an embodiment of the present invention, a member is provided that can be used with a welding system having a torch and a wire feeder. The member includes a first portion separated from a second portion, and a curved portion in between the first portion and the second portion. The first portion, the second portion, and the curved portion have a thickness and a width. The first portion includes a first length and the second portion includes a second length. The second portion includes a straight edge, the first portion includes an opening, wherein the opening is configured to receive a portion of a portion of a connection assembly that directly or indirectly connects the wire feeder to the torch. The member further includes an aperture on the second portion, wherein the aperture is configured to receive a fastener to secure to the wire feeder for the welding system.

In accordance with an embodiment of the present invention, a wire feeder is provided that includes at least the following: a wire entrance location that is configured to receive a wire; one or more drive rolls that feed wire from the wire entrance location to a wire exit location; a female member coupled to a portion of the wire feeder proximate to the wire exit location; a male member configured to mate with the female member, wherein the male member is integrated to or coupled with a torch or a torch cable; a member that includes a first portion, a second portion, and a curved portion connecting and in between the first portion and the second portion; the second portion of the member is secured to the female member; and the first portion of the member blocks a path of the male member prevent detachment of the male member from the female member.

In accordance with an embodiment of the present invention, a welder system is provided that includes at least the following: a power supply configured to output a welding current to an electrode to create an arc between the electrode and a workpiece; a wire feeder configured to deliver a welding wire to the arc, wherein the welding wire includes a wire delivery path to the arc; the wire delivery path is from the wire feeder to a torch cable to a welding torch; the welding torch performs a welding operation on the workpiece to create a weld joint, the welding torch includes the electrode; a secure screw that attaches the welding torch or the torch cable to the wire feeder; and a member having a first portion, a second portion, and a curved portion connecting the first portion to the second portion, the first portion is prevents a portion of the torch or the torch cable to from separating from the wire feeder and the second portion couples to the wire feeder.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Embodiments of the invention relate to welding methods or systems that include a member used to removeably secure a torch to a wire feeder. A member can include a first portion that is separated from a second portion, wherein a curved portion is in between the first portion and the second portion. The member can include an opening on the first portion that prevents separation from a portion of the torch. In an embodiment, the first portion of the member can block a path of disconnect/connect for the torch cable with the wire feeder by either being in contact with the torch cable or with a gap between the torch cable and the first portion. Further, the member can include an aperture on the second portion that is used to couple to the wire feeder with a fastener. The member can be used with a robot welding torch or automated welding system or a manual or semi-automatic welding torch or welding system. In an embodiment, the member can be used to retrofit to a wire feeder, a connector assembly for a torch or torch cable to prevent disruption of a wire being delivered for a welding operation.

"Welding" or "weld" as used herein including any other formatives of these words will refer to depositing of molten material through the operation of an electric arc including but not limited to submerged arc, GTAW, GMAW, MAG, MIG, TIG welding, any high energy heat source (e.g., a laser, an electron beam, among others), or any electric arc used with a welding system. Moreover, the welding operation can be on a workpiece that includes a coating such as, but not limited to, a galvanized coating.

"Component" or "Controller" as used herein can be a portion of hardware, a portion of software, or a combination thereof that can include or utilize at least a processor and a portion of memory, wherein the memory includes an instruction to execute.

While the embodiments discussed herein have been related to the systems and methods discussed above, these embodiments are intended to be exemplary and are not intended to limit the applicability of these embodiments to only those discussions set forth herein. The control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit or scope of the above discussed inventions. The embodiments and discussions herein can be readily incorporated into any of these systems and methodologies by those of skill in the art. By way of example and not limitation, a power supply as used herein (e.g., welding power supply, among others) can be a power supply for a device that performs welding, arc welding, laser welding, brazing, soldering, plasma cutting, waterjet cutting, laser cutting, among others. Thus, one of sound engineering and judgment can choose power supplies other than a welding power supply departing from the intended scope of coverage of the embodiments of the subject invention.

Figure 1:
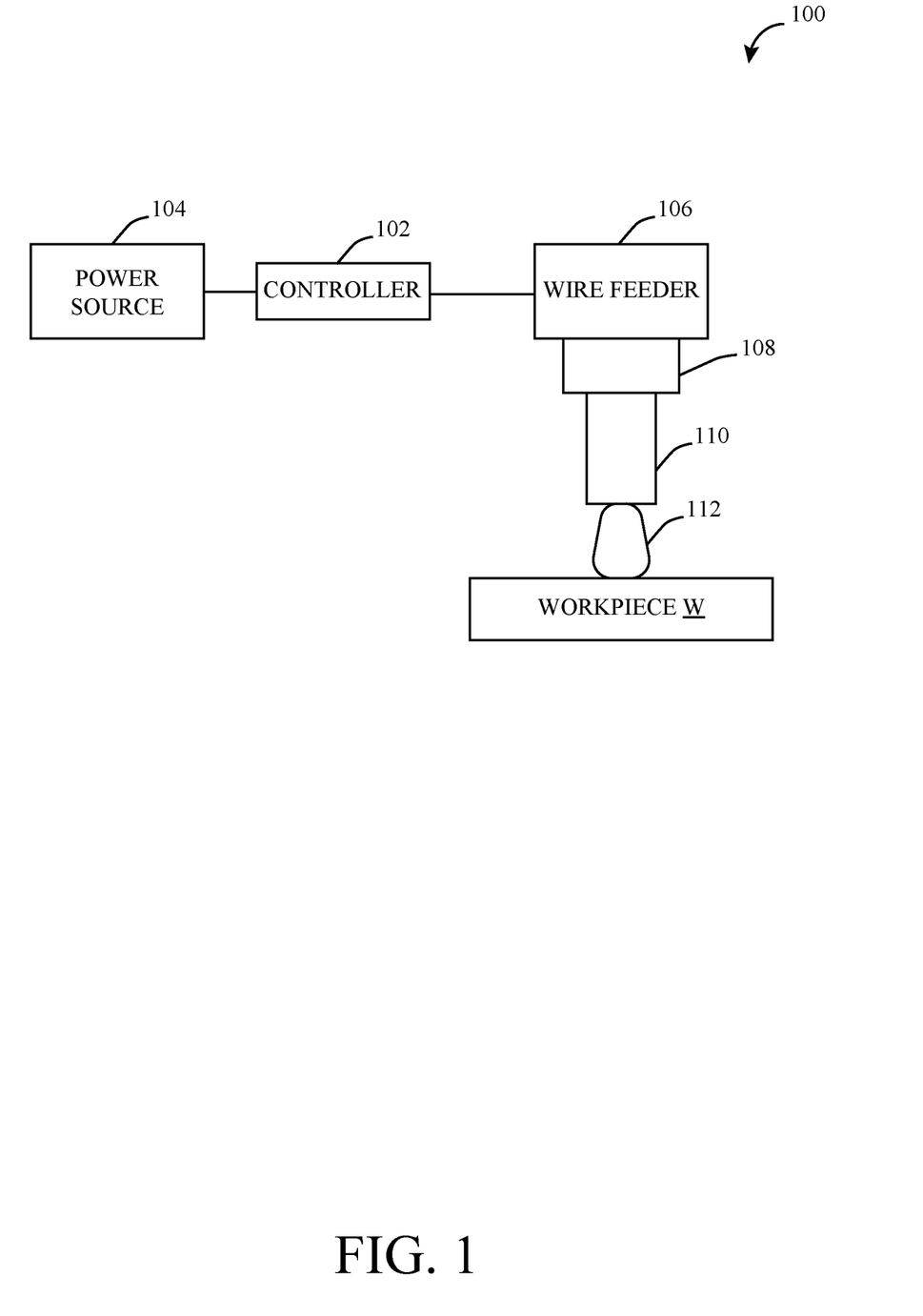
FIG. 1 illustrates an exemplary, non-limiting embodiment of a welding system that uses a member to secure a torch or torch cable to a wire feeder.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, the FIG. 1 illustrates a welding system that is used with an automated or semi-automated welding system. Turning to FIG. 1, an exemplary, non-limiting embodiment of welding system 100 is illustrated. System 100 includes welding torch 110 (also referred to as "torch") having an electrode in which power source 104 creates arc 112 between electrode and workpiece W to complete an electrical circuit to perform the welding operation. System 100 can include power source 104 that is configured to create arc 112 between an electrode and workpiece W and further include wire feeder 106 is configured to deliver welding wire to a puddle formed by the electrode. Controller 102 can be configured to manage wire feed speed (WFS) of wire feeder 106, power source 104 that creates arc 112 for the welding operation. It is to be appreciated that the system 100 can be used to perform a welding operation with a consumable electrode, a non-consumable electrode, a shielding gas, no shielding gas, or a combination thereof.

The torch 110 can be coupled to a torch cable 132 and the torch cable 132 can be coupled to the wire feeder 106, wherein the coupling between the torch cable 132 and the torch 110 or the wire feeder 106 can be releasable or non-releasable. It is to be appreciated that a torch cable (e.g., torch cable 132 shown in FIG. 5) can be used to provide connectivity between the wire feeder 106 and the torch 110 in order for the torch to receive the wire for delivery to perform the welding operation. Moreover, the connectivity between the wire feeder 106 and the torch 110 can include one or more connectors or connector assemblies. For instance, a torch cable can include a first connection assembly on a first end of the torch cable to couple the first end to the wire feeder 106. Additionally in such instance, the torch cable can include a second connection assembly on a second end, opposite the first end, of the torch cable to couple the second end to the torch 110. The connection assemblies, torch cables, extension cables, and other components that couple the wire feeder 106 to the torch 110 can be selected with sound engineering judgment without departing from the scope of the subject innovation. The torch cable 132 used to deliver the wire from the wire feeder 106 to the torch 110 can be secured to the wire feeder 106 by a mechanism 108 so as to prevent detachment of the torch cable 132 and a short that can occur from the wire escaping the delivery path from the wire feeder 106 to the torch 110.

System 100 can further include member 108 or clamp 108 that is configured to secure torch 110 to the wire feeder 106. In particular, the member 108 is configured to secure a torch cable that delivers wire to the torch 110 from detaching from the wire feeder 106. Conventionally, a secure screw is used to prevent torch 110 or torch cable from detaching from wire feeder 106. If the secure screw becomes loose, as often does during deliver of wire for the welding operation, torch 110 or torch cable can detach from the wire feeder 106 and wire can be exposed causing a short or damage to the equipment, welding operation, among others. In order to prevent torch 110 or the torch cable from detaching from wire feeder 106, the member 108 can removeably secure the torch 110 or torch cable to the wire feeder 106 based on member 108 blocking a disconnect/connect path with torch 110 or torch cable and being removeably coupled to a portion of the wire feeder 106. In an embodiment, the member 108 can be in addition to a secure screw system that is conventionally used to couple the torch cable or torch 110 to the wire feeder 106. In another embodiment, the member 108 can be used in place of a secure screw system. Member 108 can be, for example, in an "L" shape or a curved shape providing a first portion and a second portion that is attachable to secure the torch 110 to the wire feeder 106 or a first end of a torch cable to the wire feeder 106 in which the second end opposite the first end couples to the torch 110. The member 108 and features are discussed in more detail below.

It is to be appreciated that the member 108 can be fabricated from any suitable material used with a welding system, wire feeder, torch, or device used with performing a welding operation. In particular, member 108 can be fabricated from a material such as, but not limited to, a metal, a steel, a polymer, an aluminum, a copper, a nickel, a composite material, or a combination thereof. In another embodiment, the member 108 can be a first material with a second material overlay in which the first material can be, but is not limited to, a metal, a steel, an aluminum, a copper, a nickel, or a composite material and the second material can be a rubber or polymer. In order to maintain a position of the member 108, a fastener can be used to secure the member 108 to a portion of the wire feeder 106 such that the member 108 is coupled to the portion of the wire feeder 106 and a portion of the member 108 restrains movement of the torch 110 or a torch cable coupled to the torch 110. The member 108 is configured with a shape that is attachable to a portion of the wire feeder 106 and further block a path of the torch 110 or the torch cable coupled to the torch 110 such that the path is defined as a direction to disconnect the torch 110 from the wire feeder 106. In a particular embodiment, the first portion 202 can be in contact with at least one of a portion of the torch 110, a portion of a connection assembly for the torch 110, a portion of a connection assembly for the torch cable connecting the wire feeder 106 to the torch 110, or a portion of the torch cable. The contact provided by the member 108 can apply force to such that detachment or separation from the portion of the wire feeder 106 is prevented. In another particular embodiment, the member 108 can include a gap or space between the torch 110 and the portion of the wire feeder 106 the member 108 is coupled to, wherein the member 108 prevents the torch 110 from sliding out of connectivity with the wire feeder 106. In general, the member 108 can prevent disconnect of a male connector of the torch from the female receiver on the wire feeder, wherein the prevention is based on at least the member being in between a path of connection or disconnection for the male connector and the female receiver.

The welding system 100 can include the wire feeder 106 directly coupled to the torch 110. In such an example, the member 108 can be coupled to a portion of the wire feeder 106 in which a portion of the member 108 prevents the torch 110 from disconnecting a delivery path of wire from the wire feeder 106 to the torch 110 to perform the welding operation. In such an example, the wire delivery path is from the wire feeder 106 to the torch 110. In another example, the welding system 100 can include the wire feeder 106 coupled indirectly to the torch 110 via a torch cable 132 (shown in FIG. 5) and one or more connection assemblies. In such an example, the wire delivery path is from the wire feeder 106 to the torch cable 132 to the torch 110. The member 108 can be used to secure the torch cable 132 to a portion of the wire feeder 106. In the situation where a connection assembly is used for one or more ends of the torch cable, the wire delivery path is from the wire feeder 106 to a connection assembly to the torch cable to a connection assembly to the torch 110. The member 108 can be used to secure the connection assembly to a portion of the wire feeder 106.

Figure 2:
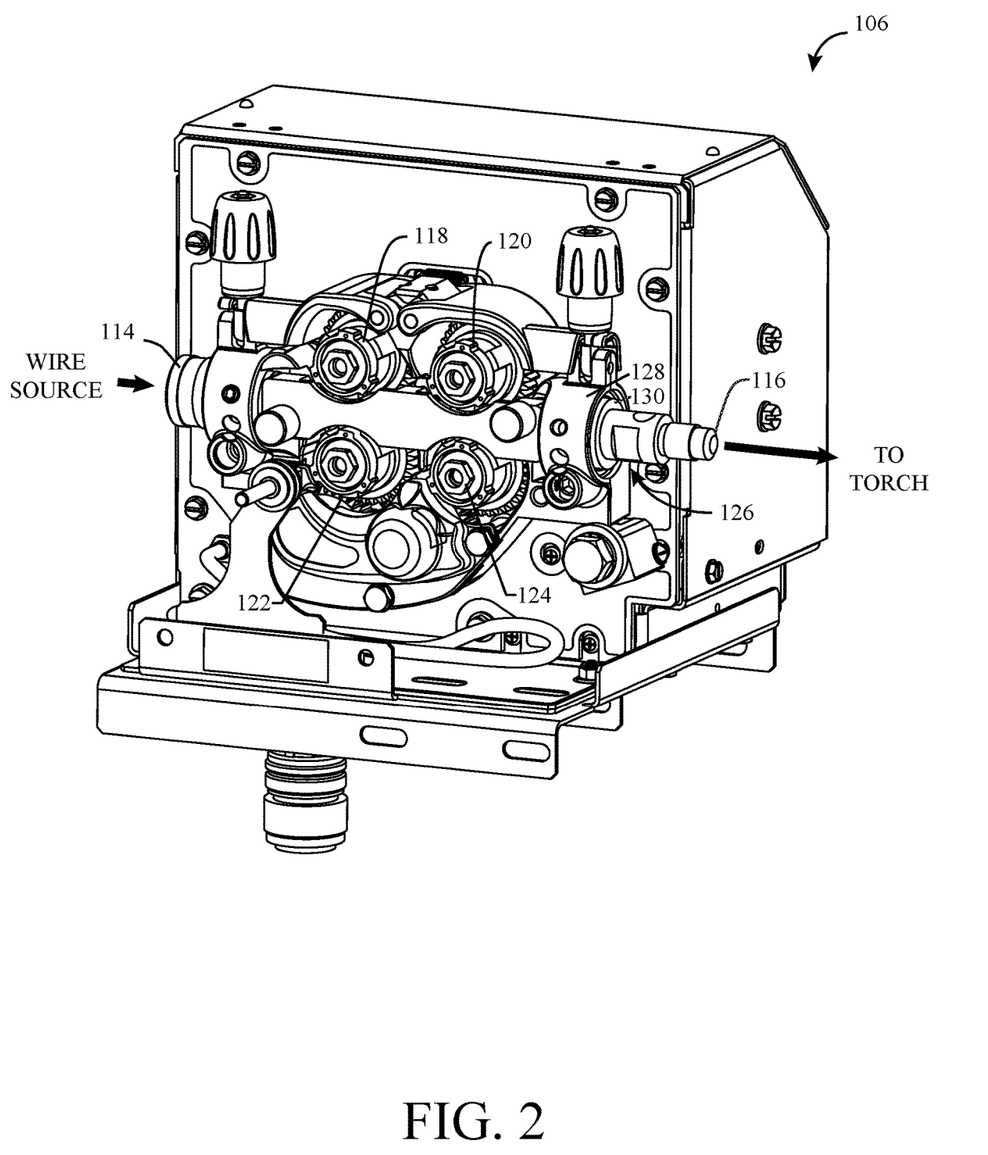
FIG. 2 illustrates an exemplary, non-limiting embodiment of a wire feeder in a welding system.
Figure 3:
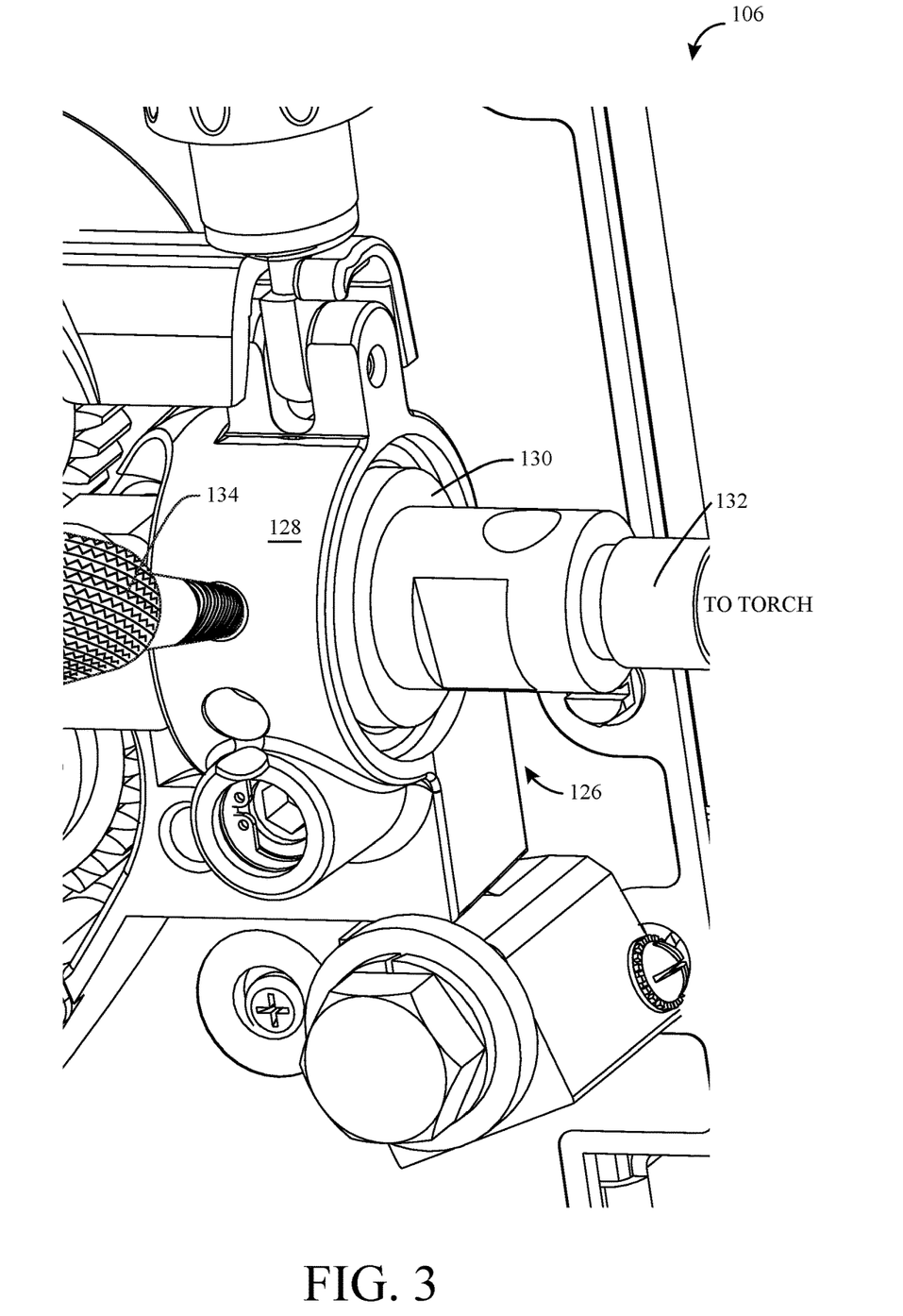
FIG. 3 illustrates an exemplary, non-limiting embodiment of a wire feeder.

FIGS. 2 and 3 illustrate the wire feeder 106 that is configured to deliver wire to the torch 110 to perform a welding operation. The wire feeder 106 can include a wire entrance location 114 to which wire from a wire source is received. In an embodiment, the wire source can be a spool of wire for the particular welding operation. Moreover, the wire feeder 106 can include a support or arm to hold a spool of wire. The wire feeder 106 can include one or more drive rolls that drive the wire from the wire entrance location 114 to a wire exit location 116. The wire feeder 106 is depicted with four (4) drive rolls 118, 120, 122, and 124. The wire from the wire exit location 116 is further driven either directly to the torch 110 or indirectly to the torch. In the situation with an indirect feed to the torch 110, the wire can be delivered from the wire feeder 106 through a first connection on a first end of a torch cable 132, from the first connection on the first end of the torch cable 132 through the torch cable 132, from the torch cable 132 to a second connection on a second end of the torch cable 132 (opposite the first end), from the second connection through to the torch 110.

The wire feeder 106 can include a first connection assembly 126 that couples the wire feeder 106 to the torch cable 132 to facilitate delivery of wire via the torch cable 132 to the torch 110. The first connection assembly 126 can be on a first end of the torch cable 132 and a second end of the torch cable 132 can be coupled to the torch 110 via a second connection assembly. In another embodiment, the second end of the torch cable 132 does not include the second connection assembly but rather the torch 110 is integrated to the second end of the torch cable 132.

The first connection assembly 126 can include a female member 128 and a male member 130, wherein the female member 128 is secured to a portion of the wire feeder 106. The female member 128 can be a collar shape to which the male member 130 is configured to mate therein. In an embodiment, the male member 130 can include a length, a first end and a second end opposite thereto, wherein the first end mates with the female member 128 in the collar shape. The first end of the male member 130 can further include a first diameter that is greater than a second diameter of the second end of the male member 130. The male member 130 is further coupled or integrated to the torch cable 132. Further, the female member 128 can include a screw system 134 that includes a hole in the female member 130 that allows a screw to be inserted through to releaseably attach to the first end of the male member 130.

Figure 4:
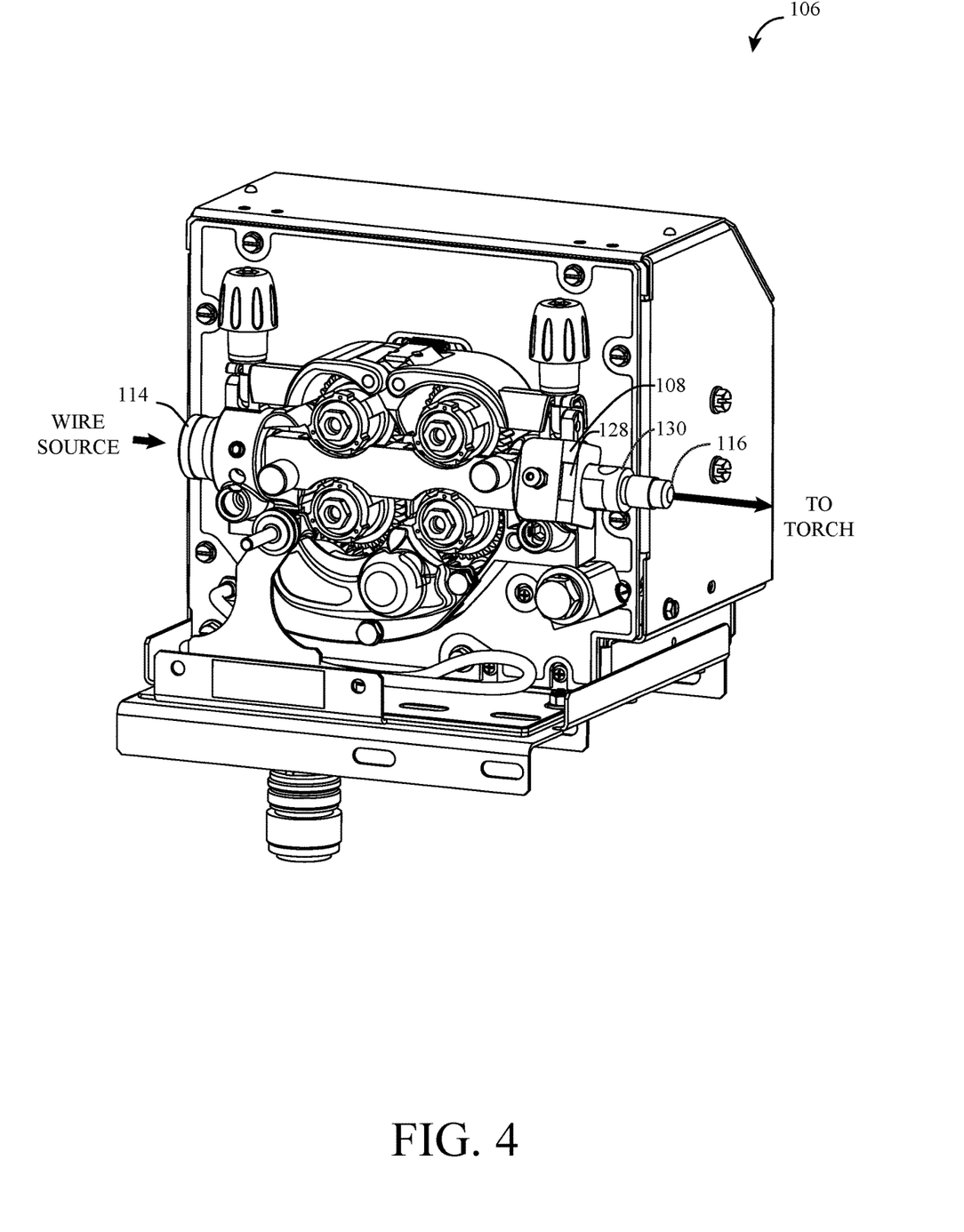
FIG. 4 illustrates an exemplary, non-limiting embodiment of a wire feeder in a welding system that utilizes a member to prevent detachment of a torch or torch cable.
Figure 5:
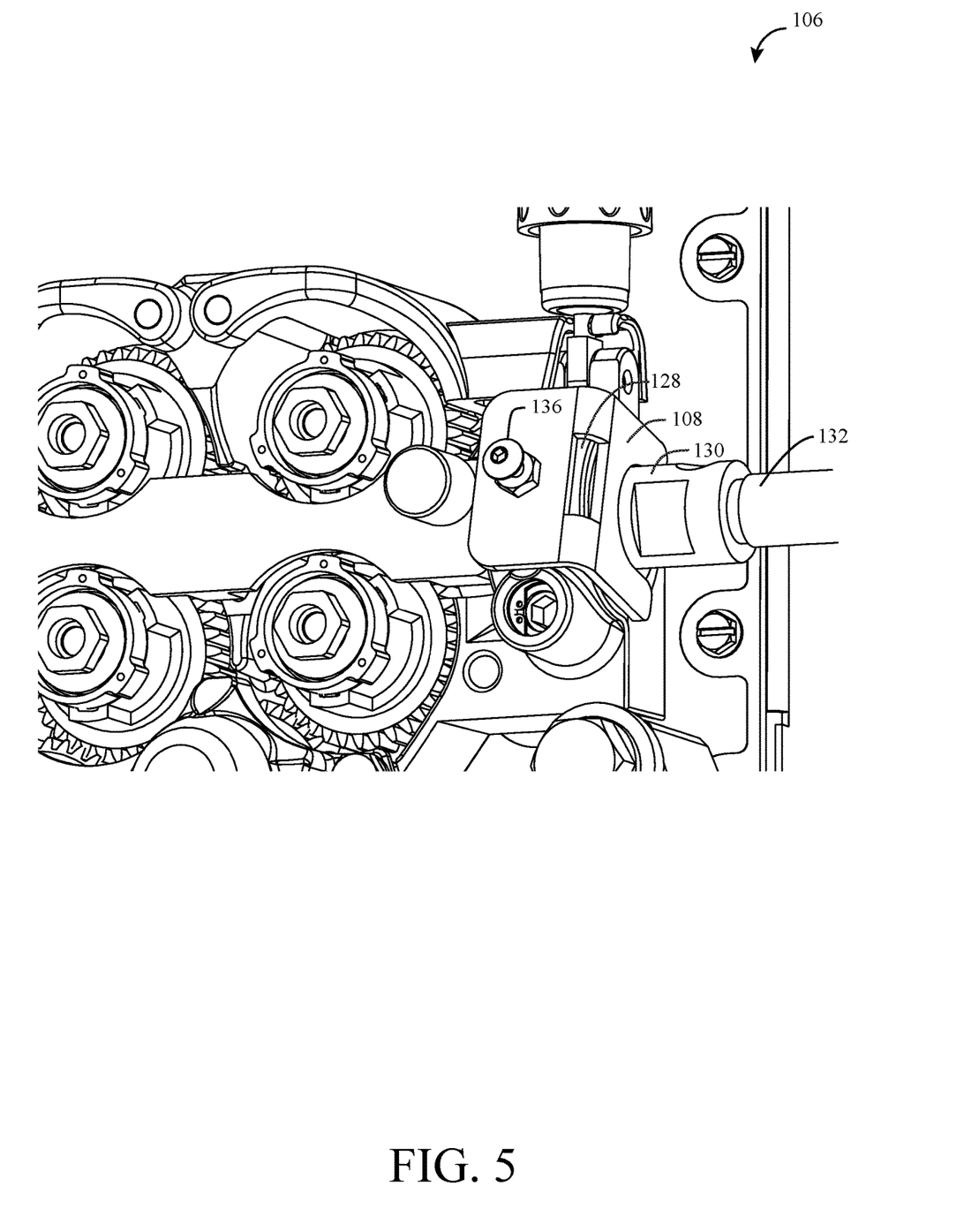
FIG. 5 illustrates an exemplary, non-limiting embodiment of a wire feeder in a welding system that utilizes a member to prevent detachment of a torch or torch cable.

FIGS. 4 and 5 illustrates the wire feeder 106 that includes the member 108 coupled to a portion of the wire feeder 106 to prevent the torch 110 or torch cable 132 from detaching and interrupting the delivery of wire path for the welding operation. As illustrated, the member 108 can be affixed to the female member 128 of the wire feeder 106 in order to secure the male member 130 and, in turn, the torch 110 or the torch cable 132.

Figure 6:
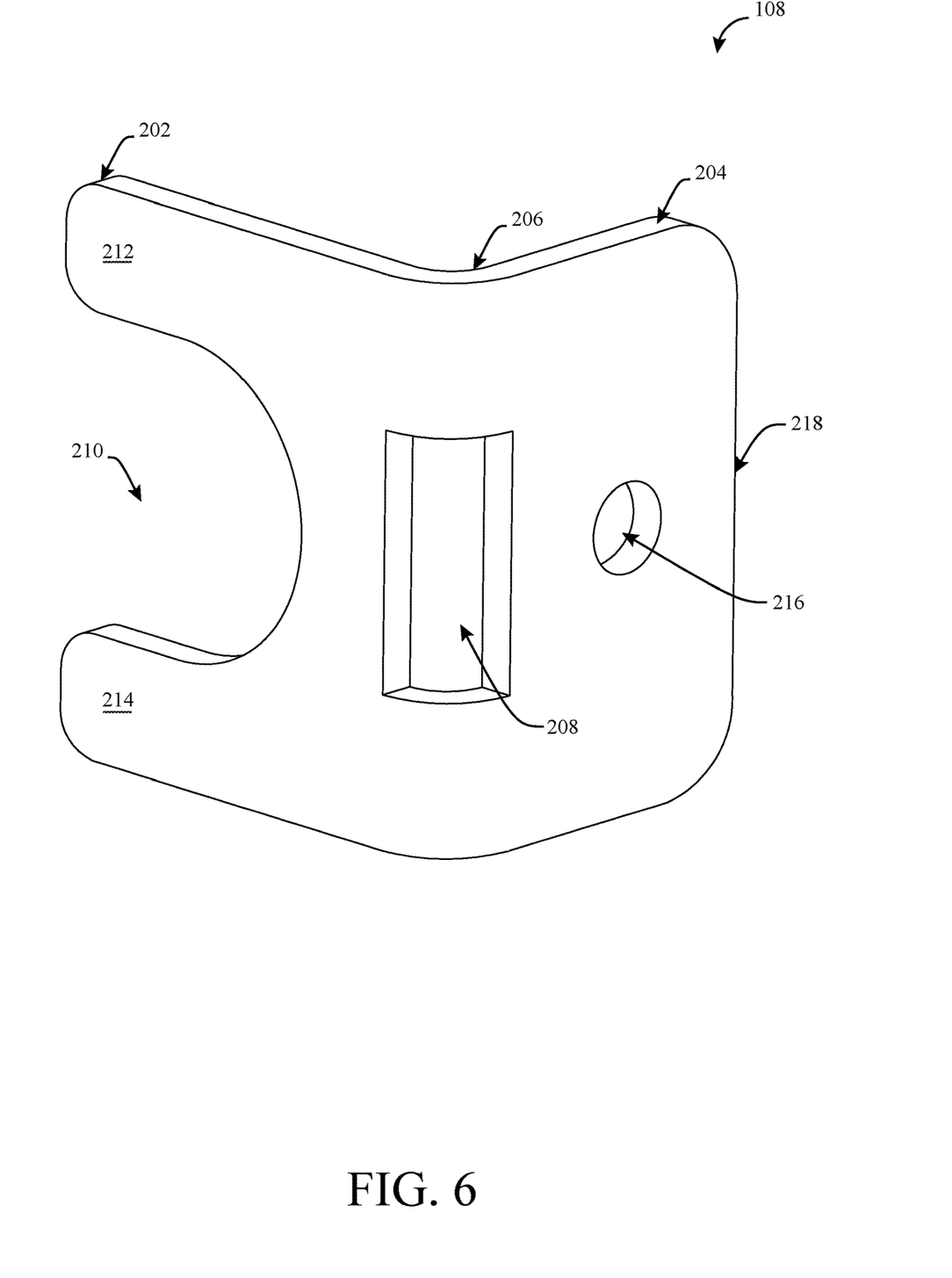
FIG. 6 illustrates a perspective view of a member in accordance with the subject innovation.

FIGS. 6 through 15 illustrate the member 108. Turning to FIG. 6, the member 108 is illustrated and includes a first portion 202 separated from a second portion 204, wherein a curved portion 206 is in between and connects the first portion 202 and the second portion 204. The curved portion 206 can connect and transition between the first portion 202 and the second portion 204 such that an angle is created for such transition and connection, wherein the angle can be, but is not limited to being, approximately 80 degrees to 100 degrees. It is to be appreciated that the angle can be configured such that the first portion 202 of the member 108 fits on at least one of a portion of the torch 110, the torch cable, a connection assembly for a torch cable, or a combination thereof. Further it is to be appreciated that the angle can be configured such that the second portion 204 can be coupled to the wire feeder 106. In a particular embodiment, the curved portion 206 is configured such that first portion 202 and second portion 204 are 90 degrees apart in which the first portion 202 fits around the female member 128 and on top of or on top of the male member 130 as illustrated in FIGS. 4 and 5. In particular, the member 108 can be in contact with a surface of the female member 128 such as a rim of the collar shape of the female member 128 and on top of the male member 130. The first end 802 of the male member 130 can have a first diameter and the second end 804 of the male member 130 can have a second diameter (see FIG. 8) such that an opening 210 fits around the second diameter of the second end 804 of the male member 130 but not the first end 802, wherein such opening 210 can facilitate the member 108 blocking a path of disconnect or connect between the first end 802 and the female member 128. In another embodiment, the member 108 can include a gap or space between the surface of the female member 128 such as a rim of the collar shape of the female member 128 and on top of the male member 130 The female member 128 can be integrated to the wire feeder 106 or coupled to a portion of the wire feeder 106 via one or more fasteners or bolts.

Member 108 can include various cutouts or apertures to be configured to fit with the wire feeder 106, the torch cable 132, a connection assembly such as connection assembly 126, and/or the torch 110. For instance, curved portion 206 can include a slot or opening 208. In a particular example, the opening 208 can be a rectangle shape location on the curved portion 206 to allow visibility to a seating of the female member 128 with the male member 130. It is to be appreciated that the opening 208 can be provided in a shape or size to facilitate bending and such size or shape can be selected with sound engineering judgment without departing from the scope of the subject innovation. In another embodiment, the curved portion 206 can be solid and not include an opening 208.

Member 108 can further include the opening 210 on the first portion 202, wherein the opening 210 can be shaped or configured to fit around, have a spacing or gap, or be in contact with at least one of a portion of the torch 110, a portion of the connection assembly 126, a portion of the torch cable 132, or a combination thereof. In a particular embodiment, the opening 210 can be shaped as a portion of a circle or a half of a cylinder having a hemispherical end, wherein the opening 210 creates a first arm 212 and a second arm 214. The first arm 212 and the second arm 214 can be in contact or have a space between with a portion of the torch 110 or the torch cable 132 and, in particular, a male member 130 so as to maintain insertion of the male member 130 into the female member 128 of the wire feeder 106. The second portion 204 can include an edge 218 that can be straight or flat in comparison to opening 210 on the first portion 202. Yet, it is to be appreciated that the edge 218 can be straight, curved, angled, among others so as to conform to the shape of the portion of the wire feeder 106 the member is to attach. In a particular example, the shape of the edge 218 can correspond to the female member 128 of the wire feeder 106.

The member 108 can further include an aperture 216 on the second portion 204, wherein the aperture 216 is configured to receive a fastener to secure to a portion of the wire feeder 106. For example, the fastener can be a bolt 136 (shown in FIG. 5). It is to be appreciated that the fastener can be, but is not limited to being, a bolt, a wingnut, a screw, a hex bolt, a pin, among others. In one embodiment, the fastener or bolt 136 can secure the member 108 to the female member 128 of the wire feeder 106 via the aperture 216 that aligns with the screw system 134 (shown in FIG. 3). In another embodiment, the fastener or bolt 136 can be in addition to the screw system 134 and have a respective coupling via an aligned hole with the aperture 216.

The member 108 can be used in replacement of or in combination with the screw system 134. In particular, the screw system 134 can be integrated into or in addition to a clamp technique used to couple the torch 110 to the wire feeder 106. For example, the torch assembly for connectivity to a wire feeder can include the torch with a male insert that mates with a female part on the wire feeder, wherein the female part contains a separate piece that gets wedged into contact with the male member as the screw system is tightened. If being used in combination with the screw system 134, the member 108 can be coupled to the wire feeder 106 via the screw system 134 and the aperture 216 such that a screw or coupling can be aligned with the aperture 212 for securing to a portion of the wire feeder 106. If being used in replacement of the screw system 134, the screw system 134 can be replaced with the member 108.

It is to be appreciated that a torch quick release mechanism can be used for the fastener rather than the bolt 136. Such torch quick release mechanism is described in U.S. patent application Ser. No. 15/607,823. Such application is hereby incorporated by reference.

Figure 7:
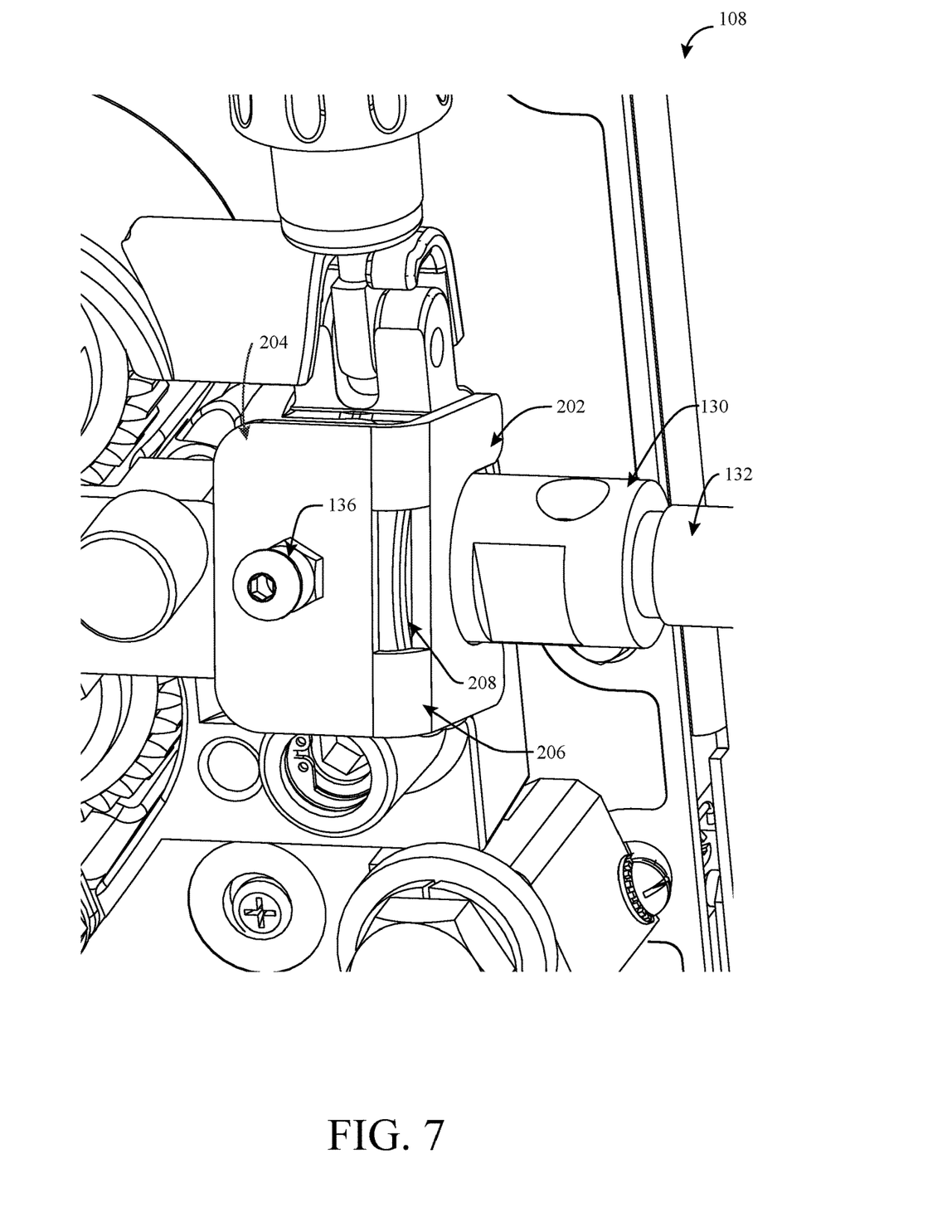
FIG. 7 illustrates a perspective view of a member in accordance with the subject innovation.

FIG. 7 further illustrates member 108 releaseably coupled to the wire feeder 106 such that the torch 110 is secured to prevent detachment from wire feeder 106 by securing the male member 130 to the female member 128 of the wire feeder 106. The member 108 can maintain the position of the male member 130 of the torch 110 or the torch cable 132 inside or engaged to the female member 130 of the wire feeder 106 based on the member 108 being secured to the wire feeder 106 via the fastener 136.

Figure 8:
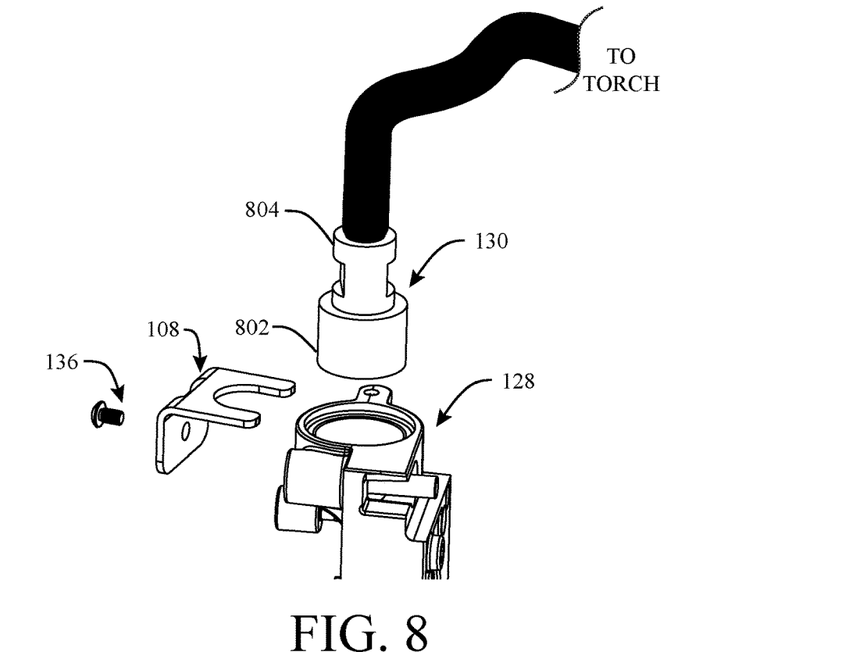
FIG. 8 illustrates an exploded view of a member, a female member, a male member, and a torch cable in accordance with the subject innovation.

Turning to FIG. 8, an exploded view of the female member 128, the male member 130, the torch cable 132 coupled or integrated to the male member 130, and the member 108 is illustrated. Torch 110 can include the male member 130 that mates with the female member 128 that is incorporated with or coupled to the wire feeder 106, wherein the male member 130 can include a first end 802 and a second end 804 opposite thereof. The first end 802 can include a first diameter and the second end 804 can include a second diameter, wherein the first diameter is greater than the second diameter and the first diameter is configured to fit inside a diameter of the female member 128 having a circular or round shape. The first portion 202 of the member 108 can be in contact (or be spaced apart from) with a top side (e.g., exposed while mating with the female member 128) of the first end 802 of the male member 130 while allowing the second end 804 to be exposed through the opening 210 of the member 108. The second portion 204 of the member 108 can be in physical contact with a portion of a sidewall of the female member 128. It is to be appreciated that the second portion 204 can include a part (e.g., washer, spacer, etc.) in between the portion of the sidewall of the female member 128 rather than be in direct physical contact. The member 108 can be secured to the female member 128 coupled to or integrated with the wire feeder 106 in which the member is secured with a fastener or bolt 136. The secured second portion 204 of the member 108 and the physical blocking of the path for connect or disconnect between the first portion 202 of the member 108 to the male member 130 maintains position of the torch cable or the torch 110 to prevent detachment and exposure of wire from the wire delivery path of the welding operation. It is to be appreciated that a first end of the torch cable 132 can be coupled or integrated to the male member 130 and a second end opposite of the first end of the torch cable 132 can be integrated or coupled to the torch 110. It is to be appreciated that the male member 130 can be one piece as depicted or be one or more pieces. For example, the male member 130 can be a first piece 802 that includes the first diameter that is releaseably or permanently coupled to a second piece 804 that includes the second diameter.

It is to be appreciated that the member 108 can be a size or a shape, having apertures or openings based on a welding parameter for example. By way of example, the welding parameter can be a type of welding operation, a type of hose on the wire feeder 106, a type or shape of connector used with a torch or a torch cable, a wire exit location of a wire feeder, a type of wire feeder, a type of torch, a male connector, a female connector, a connector assembly, a type of shielding gas, a material composition of workpiece W, a welding pattern, a type of electrode, a composition of electrode, a wire feed speed, a waveform used for the welding operation, a polarity of a welding wire, a type of flux, a number of electrodes used in the welding operation, an arc voltage, a travel speed of a tractor welder that performs the welding operation, a travel speed of a torch that performs the welding operation, an arc current level, a height of torch, a distance between workpiece W and torch or an end of the electrode, an oscillation width of electrode, a temperature of welding wire, a temperature of electrode, a type of material of workpiece W, a frequency of oscillation of electrode, a polarity of the arc current, a polarity of the current for welding wire, a parameter that affects an arc current of the welding operation, a gauge of wire, a material of wire, an oscillation dwell, a left oscillation dwell, a right oscillation dwell, one or more temperatures of workpiece W at one or more locations on workpiece W, a temperature of workpiece W, any and all variation of advanced process controls (e.g., move controls, pulse-frequency, ramp rates, background level ratios, etc.), and the like.

Figure 9:
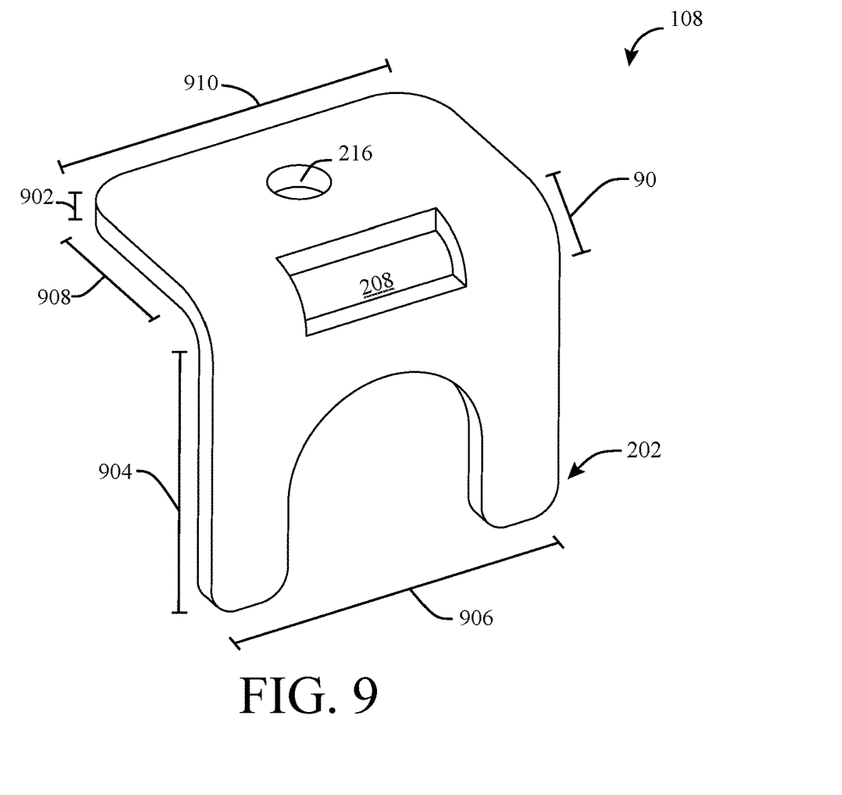
FIG. 9 is a perspective view of the member.

Turning to FIG. 9, the member 108 can include a thickness 902 and the first portion 202 can include a length 904 and a width 906. Further, the second portion 204 can include a length 908 and a width 910. It is to be appreciated that the member 108 can include a uniform thickness for the first portion 202, the second portion 204 and the curved portion 206. In another embodiment, each of the first portion 202, the second portion 204, and the curved portion can have respective thicknesses. Moreover, the member 108 is illustrated such that the width 910 of the second portion 204 and the width 906 of the first portion 202 are the same but it is to be appreciated that the respective widths 906 and 910 can be different and selected with sound engineering judgment without departing from the scope of the subject innovation.

Figure 10:
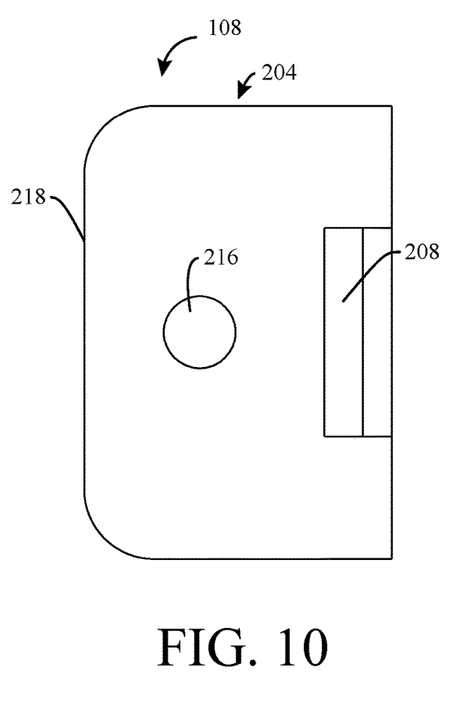
FIG. 10 is a top view of the member illustrated in FIG. 9.
Figure 11:
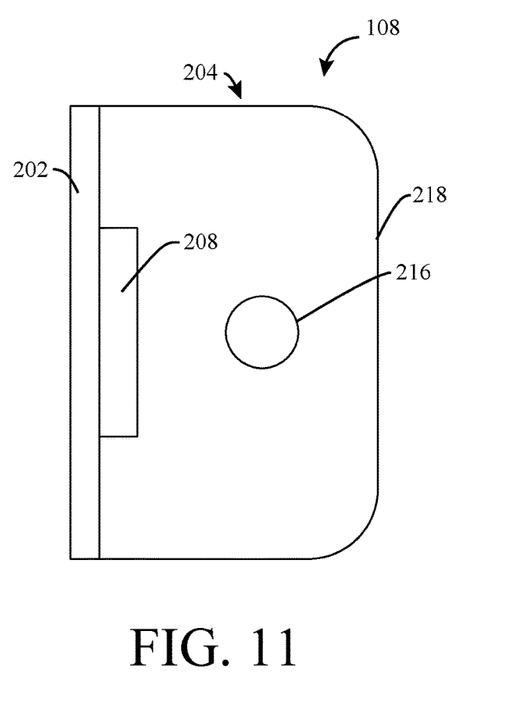
FIG. 11 is a bottom view of the member illustrated in FIG. 9.
Figure 12:
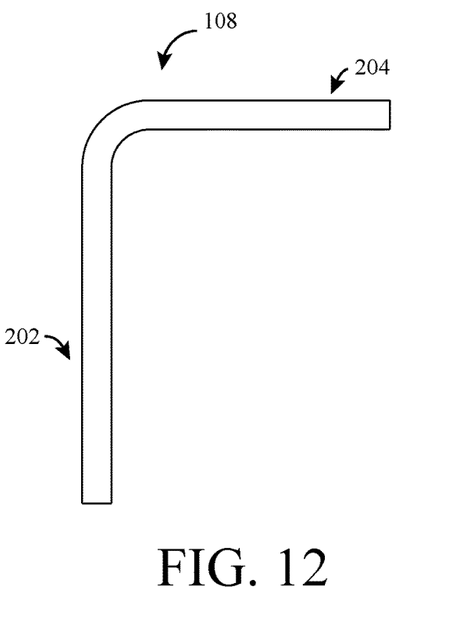
FIG. 12 is a left side view of the member illustrated in FIG. 9.
Figure 13:
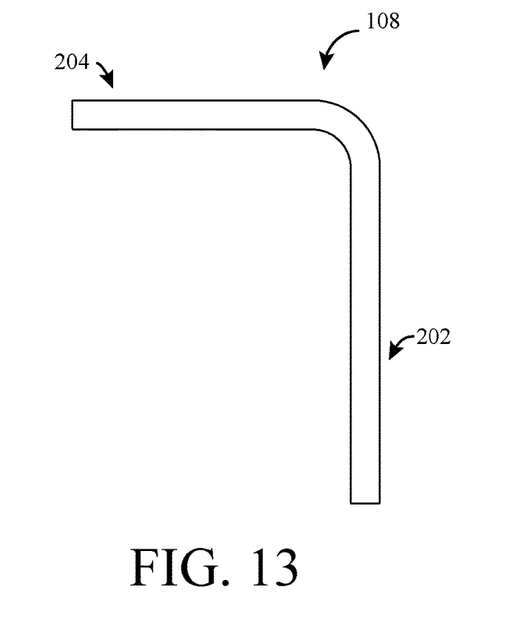
FIG. 13 is a right side view of the member illustrated in FIG. 9.
Figure 14:
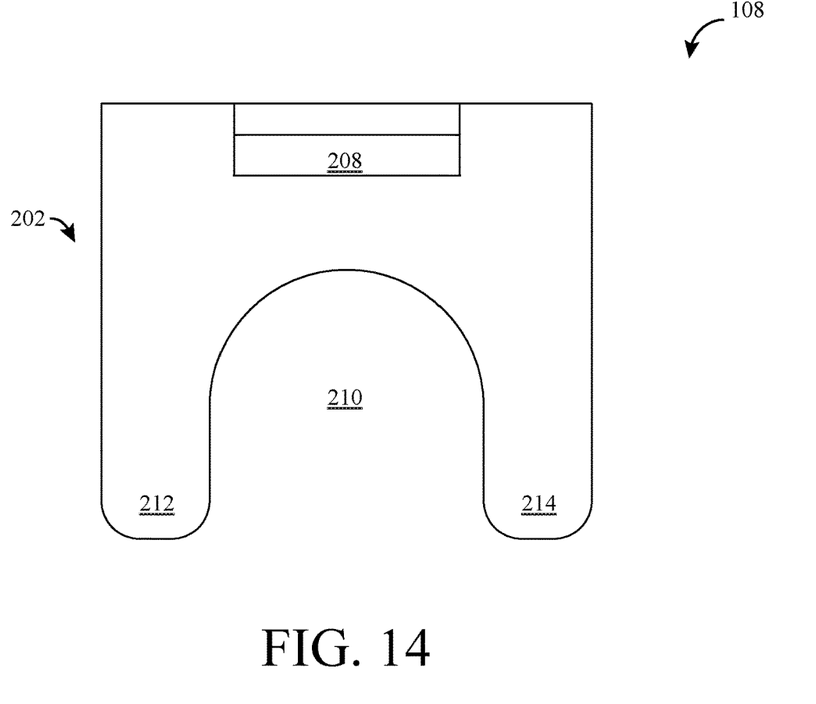
FIG. 14 is a back side view of the member illustrated in FIG. 9.
Figure 15:
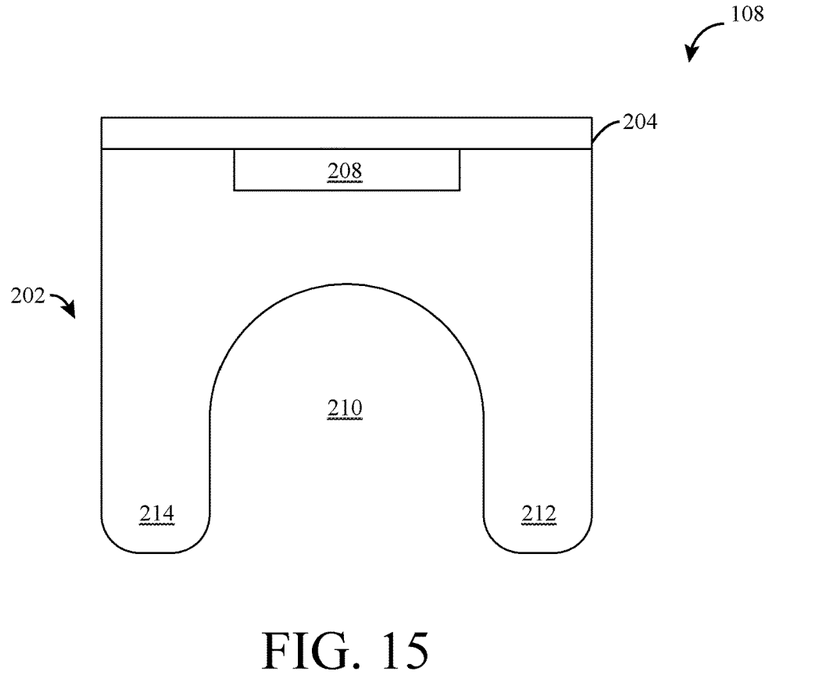
FIG. 15 is a front side view of the member illustrated in FIG. 9.

FIGS. 9-15 illustrate the member 108. In particular, FIG. 9 is a perspective view of member 108. FIG. 10 is a top view of the member illustrated in FIG. 9. FIG. 11 is a bottom view of the member illustrated in FIG. 9. FIG. 12 is a left side view of the member illustrated in FIG. 9. FIG. 13 is a right side view of the member illustrated in FIG. 9. FIG. 14 is a back side view of the member illustrated in FIG. 9. FIG. 15 is a front side view of the member illustrated in FIG. 9.

In an embodiment, the member further comprising a slot on the curved portion. In an embodiment, the opening forms a first arm and a second arm. In an embodiment, the opening is shaped as a half capsule or semi-circle. In an embodiment, the opening is shaped as a portion of a cylinder having a hemispherical end. In an embodiment, the curved portion between the first portion and the second portion is between eighty (80) degrees and one hundred (100) degrees.

In an embodiment, the connection assembly includes a first end and a second end opposite thereto, the first end couples to a portion of the wire feeder and the second end couples or is integrated to the torch.

In an embodiment, the connection assembly further comprising a male member having a first end and a second end opposite thereto, the first end having a first diameter and the second end having a second diameter, wherein the first diameter is greater than the second diameter; and a female member integrated to or coupled to the wire feeder, wherein the female member is configured to mate and receive the first end of the male member.

In an embodiment, the first portion of the member is in physical contact (or has a space in between) with a portion of a top side of the first end of the male member while the second end of the male member is exposed through the opening of the member.

In an embodiment, the second portion of the member is in physical contact (or has a space or part in between) with a portion of a sidewall of the female member. In an embodiment, the female member includes a screw hole and a screw that couples thereto to secure the female member to the male member in addition to the member. In an embodiment, the aperture is aligned with the screw hole and the fastener couples through the member, the aperture and into the screw hole without the screw. In an embodiment, the member is fabricated from at least one of a metal or steel.

In an embodiment, the female member further comprising a screw system situated on a sidewall of the female member. In an embodiment, wherein the curved portion includes a slot to provide visibility to a mating of the female member with the male member. In an embodiment, the male member includes a first end, a second end opposite the first end, wherein the first end includes a first diameter and the second end includes a second diameter that is smaller than the first diameter. In an embodiment, the first portion of the member includes an opening that creates a first arm and a second arm configured to fit around a portion of the male member. In an embodiment, the first portion of the member is in physical contact (or has a space in between) with the first end of the male member to maintain mating with the female member while allowing the second end of the male member to pass through the opening that creates the first arm and the second arm.

Figure 16:
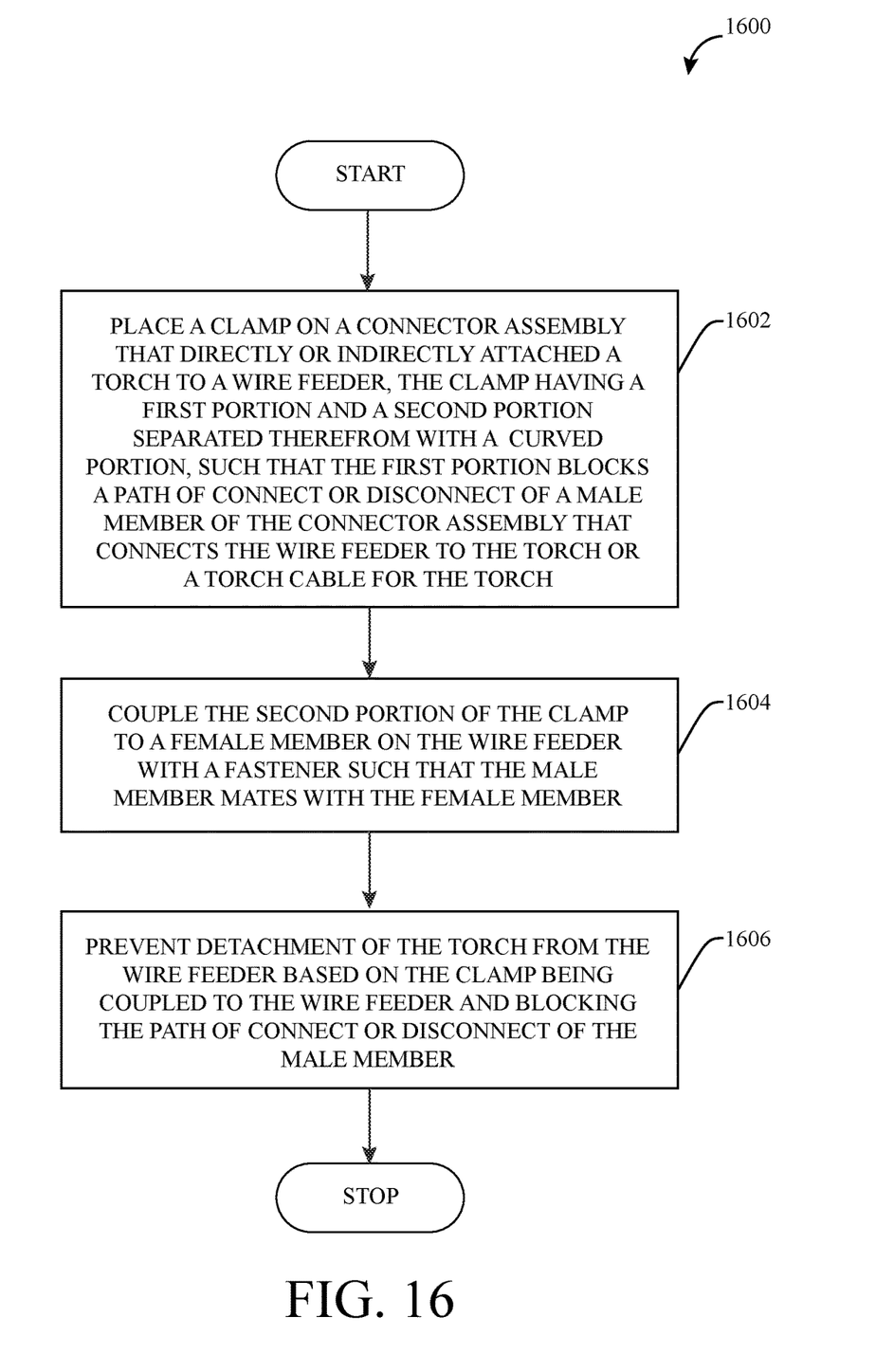
FIG. 16 is a flow diagram of utilizing a clamp member to prevent detachment of a torch or torch cable from a wire feeder.

In view of the exemplary devices and elements described supra, methodologies that may be implemented in accordance with the disclosed subject matter will be better appreciated with reference to the flow charts and/or methodology of FIG. 16. The methodologies and/or flow diagrams are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods and/or flow diagrams described hereinafter.

Sequentially, the following occurs as illustrated in the decision tree flow diagram 1600 of FIG. 16 which is a flow diagram 1600 that prevents a torch or a torch cable detaching from a wire feeder. At reference block 1602, a clamp having a first portion and a second portion separated therefrom with a curved portion is placed on a connector assembly that directly or indirectly (via a torch cable) attaches a torch to a wire feeder such that the first portion is blocks a path of connect or disconnect of a male member of a connector assembly that connects a wire feeder to a torch cable or a torch. At reference block 1604, the second portion of the clamp is coupled to a female member on the wire feeder with a fastener. At reference block 1606, detachment of the torch from the wire feeder is prevented based on the clamp being coupled to the wire feeder and blocking the path of connect or disconnect of the male member. Based on preventing detachment, a wire being exposed and shorted is also prevented.

While the embodiments discussed herein have been related to the systems and methods discussed above, these embodiments are intended to be exemplary and are not intended to limit the applicability of these embodiments to only those discussions set forth herein. The control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit or scope of the above discussed inventions. The embodiments and discussions herein can be readily incorporated into any of these systems and methodologies by those of skill in the art. By way of example and not limitation, a power supply as used herein (e.g., welding power supply, among others) can be a power supply for a device that performs welding, arc welding, laser welding, brazing, soldering, plasma cutting, waterjet cutting, laser cutting, among others. Thus, one of sound engineering and judgment can choose power supplies other than a welding power supply departing from the intended scope of coverage of the embodiments of the subject invention.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A member used with a welding system having a torch and a wire feeder, comprising:
   a first portion separated from a second portion;
   a curved portion in between the first portion and the second portion;
   the first portion, the second portion, and the curved portion having a thickness and a width;
   the first portion having a first length and the second portion having a second length;
   the second portion having a straight edge;
   the first portion having an opening, wherein the opening is configured to receive a portion of a connection assembly that directly or indirectly connects the wire feeder to the torch; and
   an aperture on the second portion, wherein the aperture is configured to receive a fastener to secure to the wire feeder for the welding system,
      wherein the connection assembly includes a first end and a second end opposite thereto, where the first end of the connection assembly is configured to couple to a portion of the wire feeder and the second end of the connection assembly is configured to couple or is integrated to the torch,
      wherein the connection assembly includes a male member having a first end and a second end opposite thereto, where the first end of the male member has a first diameter and the second end of the male member has a second diameter, and where the first diameter is greater than the second diameter,
      wherein the connection assembly includes a female member integrated to or coupled to the wire feeder, where the female member is configured to mate and receive the first end of the male member,
      wherein the first portion of the member is configured to be either in physical contact with a portion of a top side of the first end of the male member or indirect contact with the portion of the top side of the first end of the male member while the second end of the male member is exposed through the opening of the member, and
      wherein the female member includes a screw hole and a screw configured to couple thereto to secure the female member to the male member in addition to the member, and wherein the aperture is configured to be aligned with the screw hole and the fastener is configured to couple through the member, the aperture, and into the screw hole without the screw.

2. The member of claim 1, further comprising a slot on the curved portion.

3. The member of claim 1, wherein the opening forms a first arm and a second arm.

4. The member of claim 3, wherein the opening is shaped as a half capsule or semi-circle.

5. The member of claim 3, wherein the opening is shaped as a portion of a cylinder having a hemispherical end.

6. The member of claim 1, wherein the curved portion between the first portion and the second portion is between eighty (80) degrees and one hundred (100) degrees.

7. The member of claim 1, wherein the second portion of the member is in physical contact with a portion of a sidewall of the female member, or the second portion of the member is in physical contact with a part that is in physical contact with the portion of the sidewall of the female member.

8. The member of claim 1, wherein the member is fabricated from at least one of a metal or steel.

9. A wire feeder, comprising:
a wire entrance location that is configured to receive a wire;
one or more drive rolls that feed wire from the wire entrance location to a wire exit location;
a female member coupled to a portion of the wire feeder proximate to the wire exit location;
a male member configured to mate with the female member, wherein the male member is integrated to or coupled with a torch or a torch cable;
a member that includes a first portion, a second portion, and a curved portion connecting and in between the first portion and the second portion;
the second portion of the member is secured to the female member; and
the first portion of the member blocks a path of connect or disconnect for a portion of the male member to prevent detachment of the male member from the female member,
wherein the male member includes a first end, a second end opposite the first end, and wherein the first end includes a first diameter and the second end includes a second diameter that is smaller than the first diameter,
wherein the first portion of the member includes an opening that creates a first arm and a second arm configured to fit around a portion of the male member, and
wherein the first portion of the member physically blocks the path of connect or disconnect with the first end of the male member to maintain mating with the female member while allowing the second end of the male member to pass through the opening that creates the first arm and the second arm.

10. The wire feeder of claim 9, the female member further comprising a screw system situated on a sidewall of the female member.

11. The wire feeder of claim 9, wherein the curved portion includes a slot to provide visibility to a mating of the female member with the male member.

12. A welding system, comprising:
a power supply configured to output a welding current to a welding wire electrode to create an arc between the welding wire electrode and a workpiece;
a wire feeder configured to deliver the welding wire electrode to the arc via a wire delivery path to the arc, wherein the wire delivery path includes a torch cable and a welding torch, and wherein the wire delivery path is from the wire feeder to the torch cable to the welding torch;
a member having a first portion, a second portion, and a curved portion connecting the first portion to the second portion, where the first portion is configured to block a path of connect or disconnect with the welding torch or the torch cable to prevent separation from the wire feeder; and
a connection assembly that directly or indirectly connects the wire feeder to the welding torch,
wherein the connection assembly includes a male member having a first end and a second end opposite thereto, where the first end of the male member has a first diameter and the second end of the male member has a second diameter, and where the first diameter is greater than the second diameter,
wherein the connection assembly includes a female member integrated with or configured to be coupled to the wire feeder, and wherein the female member is configured to mate and receive the first end of the male member,
wherein the first portion of the member is configured to be either in physical contact with a portion of a top side of the first end of the male member or indirect contact with the portion of the top side of the first end of the male member, while the second end of the male member is exposed through an opening of the member, and
wherein the female member includes a screw hole configured to accept a screw therethrough to secure the female member to the male member in addition to the member.

* * * * *